United States Patent
Brown et al.

(10) Patent No.: US 7,685,286 B2
(45) Date of Patent: *Mar. 23, 2010

(54) NETWORK SCORING SYSTEM AND METHOD

(75) Inventors: Scott K. Brown, Sterling, VA (US); David L. Biderman, San Francisco, CA (US)

(73) Assignee: AOL Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/190,221

(22) Filed: Aug. 12, 2008

(65) Prior Publication Data

US 2009/0182848 A1 Jul. 16, 2009

Related U.S. Application Data

(63) Continuation of application No. 10/746,551, filed on Dec. 29, 2003, now Pat. No. 7,412,516.

(51) Int. Cl.
*G06F 13/00* (2006.01)

(52) U.S. Cl. ............... 709/226; 709/219; 709/224; 709/229

(58) Field of Classification Search ............... 709/217, 709/219, 223, 224, 226, 227, 229
See application file for complete search history.

(56) References Cited

U.S. PATENT DOCUMENTS

| | | | | |
|---|---|---|---|---|
| 6,876,668 | B1* | 4/2005 | Chawla et al. | 370/468 |
| 7,062,559 | B2* | 6/2006 | Yoshimura et al. | 709/226 |
| 7,519,916 | B1* | 4/2009 | Hartwell et al. | 715/771 |
| 2002/0167967 | A1* | 11/2002 | Jammes et al. | 370/468 |
| 2004/0199635 | A1* | 10/2004 | Ta et al. | 709/226 |

* cited by examiner

*Primary Examiner*—Viet Vu
(74) *Attorney, Agent, or Firm*—Fish & Richardson P.C.

(57) ABSTRACT

A client may be configured to access a network by identifying a network bandwidth configuration setting to be used by the client in accessing a networked content source, enabling the client to access the content source using the network bandwidth configuration setting, monitoring client access to the content source, comparing client access metrics to metrics associated with the network bandwidth configuration setting, determining, based on the comparison, whether to adjust the network bandwidth configuration settings for the client, and adjusting the network bandwidth configuration setting if appropriate.

16 Claims, 4 Drawing Sheets

NETWORK SCORING SYSTEM AND METHOD

CROSS-REFERENCE TO RELATED APPLICATION

The present application is a continuation of U.S. patent application Ser. No. 10/746,551, filed Dec. 29, 2003, titled "A NETWORK SCORING SYSTEM AND METHOD," now U.S. Pat. No. 7,412,516. The contents of the prior application are incorporated herein in their entirety.

TECHNICAL FIELD

This document relates to managing access to and communications within communications networks.

BACKGROUND

Digital content is distributed on a wide variety of devices and in a wide variety of formats. Digital content frequently includes one or more of movies, music, slides, games and other forms of electronic content.

SUMMARY

In one general sense, a client may be configured to access a network by identifying a network bandwidth configuration setting to be used by the client in accessing a networked content source, enabling the client to access the content source using the network bandwidth configuration setting, monitoring client access to the content source, comparing client access metrics to metrics associated with the network bandwidth configuration setting, determining, based on the comparison, whether to adjust the network bandwidth configuration settings for the client, and adjusting the network bandwidth configuration setting if appropriate.

Implementations may include one or more of the following features. For example, identifying a network bandwidth configuration setting may include identifying a range of network bandwidths with one or more bandwidths that may be used to access the content source. Identifying the range may include identifying a preferred bit rate used to access the content source.

Comparing the client access metrics may include determining whether the bandwidth used in accessing the contents source was less than a bandwidth associated with the network bandwidth configuration setting, greater than a bandwidth associated with the network bandwidth configuration setting, or whether a bandwidth used in accessing the content source could have been increased.

Comparing the client access metrics may include determining whether the client experienced network interruptions in accessing the content source, and adjusting the network bandwidth configuration setting after determining the network interruptions would persist using the network bandwidth configuration setting. Adjusting the network bandwidth configuration setting may include using a tracking indicator to determine whether a particular event described by the client metric has occurred at a specified frequency. Adjusting the network bandwidth configuration setting may include using a tracking indicator to determine whether a particular event described by the client metric has occurred a specified number of times. Using the tracking indicator to determine whether the particular event described by the client metric has occurred the specified number of times may include determining whether the specified number of times has occurred repeatedly. Using the tracking indicator to determine whether the particular event described by the client metric has occurred the specified number of times may include determining whether the client increased the bandwidth used, decreased the bandwidth used, could have used an increased bandwidth, or experienced a network interruption. Adjusting the network bandwidth may include using a supportable bandwidth as indicated by the client metric or the tracking indicator. The network bandwidth configuration setting may be stored on a host or on a client.

Determining the device environment, identifying the network bandwidth configuration setting, enabling the client to access the client sources, comparing the client access metrics for access to the content source, using the client metric to adjust the tracking indicator, and adjusting the network bandwidth configuration setting may be performed on the client, a host, or a hybrid of the client and the host.

In another general sense, a client may be configured to access a network by determining a device environment for the client that identifies how the client accesses the content source, identifying a network bandwidth configuration setting to be used by the client when the client is in the device environment, enabling the client to access the content source using the network bandwidth configuration setting, monitoring client access to the content source, relating the client access metrics to a tracking indicator, and adjusting the network bandwidth configuration setting when relating the client access metrics to the tracking indicator indicates that the network bandwidth should change.

Implementations may include one or more of the following features. Determining the device environment may include identifying a media address control (MAC) address used by the client to access a network, identifying an internet protocol (IP) address in a range of IP addresses that the client is using to access the content source, or identifying an underlying transport infrastructure used by the client to access to the content source wherein the underlying transport infrastructure indicates whether a dial up modem, a wireless network, or a cable network is being used.

Network testing may be conducted to identify the network bandwidth configuration setting when the client is not in the device environment. An alternate bandwidth indicator when the client is not in the device environment. Developing the alternate bandwidth indicator may include associating an alternate environment with a screen name indicating how another device associated with the screen name accesses the content source or identifying which client should be used with the alternate bandwidth indicators.

DETAILED DESCRIPTION

Figure 1:
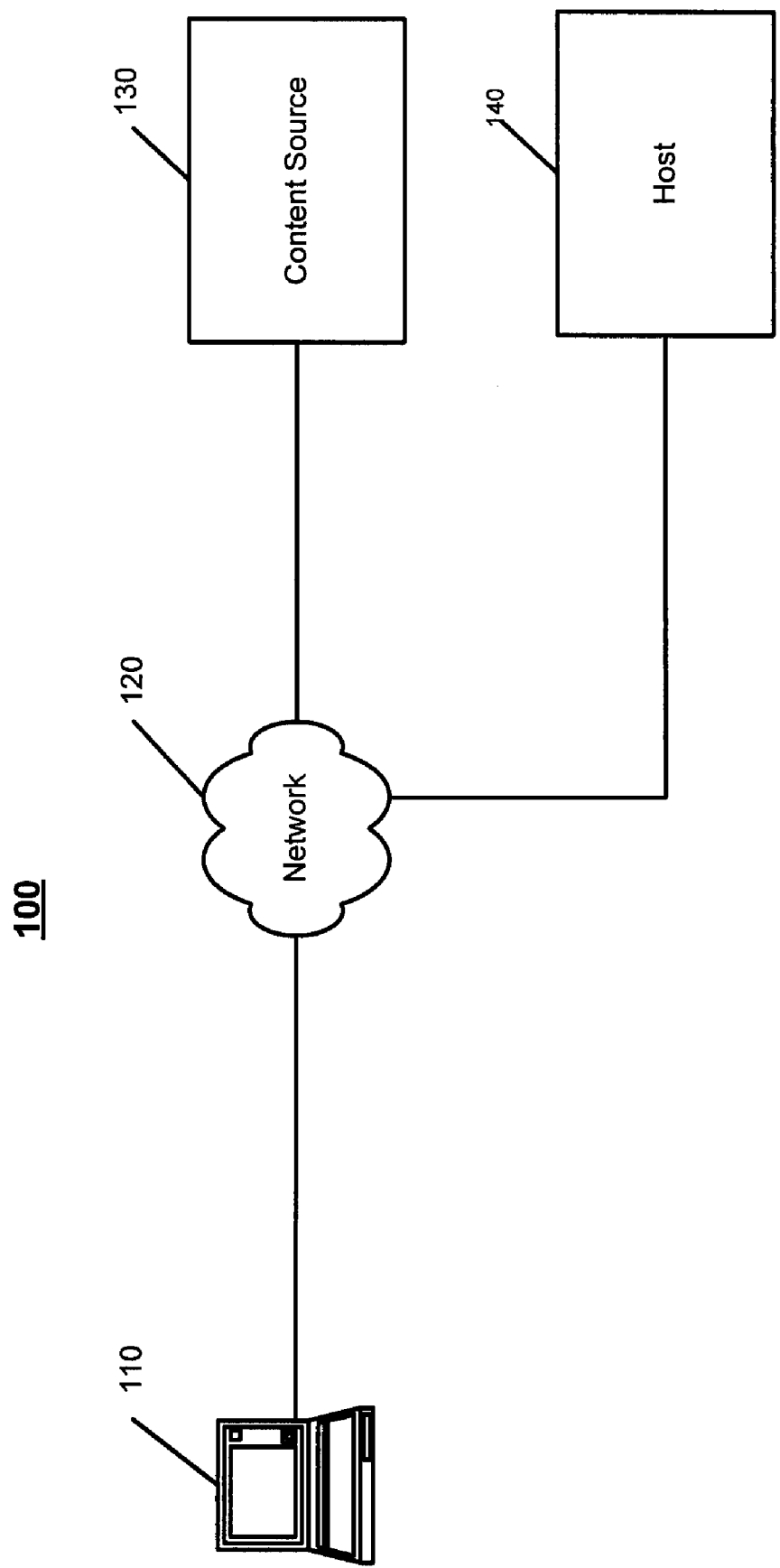
FIG. 1 is a block diagram of an exemplary communications system configured to manage access to a content source.

A content provider desires to provide their customers with the best-possible user experience. User experience may be said to improve when desired content material is made available in a relatively quick manner without interruption. One source of the interruption may relate to initial testing performed to identify a content source (e.g., a streaming video server) and a bit rate (e.g., 300 kbps). The delay resulting from performing initial testing may cause a frustrating user experience, which may lead to decreased adoption and utilization of online services (e.g., streaming video), and ultimately decreased value for the online services. For example, advertisers may pay less to advertise with a content provider whose users suffer long delays and frequent interruption since users are, likely to be less responsive after waiting (even if momentarily) for online services while testing is performed.

For this and/or other reasons, a better user experience may be provided by performing otherwise intrusive operations incident to identifying an appropriate bit rate while a user is not actively seeking content or services that would be delayed or interrupted by such operations, i.e., while client software is being used in a location or device environment for which the identified bit rate is perceived as valid. Generally, the device environment includes a setting, configuration, access mode, or parameter relating to how or from where a client accesses a content source. Examples of determining the device environment may include identifying an IP address or group of IP addresses, a MAC address, a screen name, a client identifier, or a geographical descriptor.

In one implementation of this approach, a client's access to a network may be managed by determining a device environment for a client that identifies the client and how the client accesses online resources. A network bandwidth configuration setting is used when the client is operating in the device environment. The client is made able to access online resources using a network bandwidth reflected by the network bandwidth configuration setting when the client is operating in the device environment, and a client metric is determined for access to the content. The client metric may be related or used to adjust a tracking indicator. Based on the tracking indicator, the network bandwidth configuration setting may be adjusted when the tracking indicator indicates that the network bandwidth configuration setting should change.

Applying this implementation to video streams, a client requesting access to a video stream initially identifies a device environment, for example, determining whether to use a cable modem for which network bandwidths have previously been determined. When the client uses the cable modem, the client may retrieve and use a network bandwidth configuration setting describing which bit rates should be used to access the video stream (e.g., 300 kbps). The client then may access the video stream from a streaming server, which responds to the request by transmitting the video stream to the client.

A client metric that describes the client's access to the video stream is determined. For example, the client metric may indicate that the client experienced underruns (dropped down to a lower bandwidth) while accessing the video stream.

The client metric then may be used to adjust a network bandwidth configuration setting that is used to determine whether the particular configuration (network bandwidth configuration setting) should be used. For example, when the tracking indicator indicates that the client has experienced underruns at a particular frequency or a particular number of times, the network bandwidth configuration setting may be modified so that a lower bit rate is used instead of a higher bit rate. Alternatively, when the tracking indicator indicates that a higher bit rate was used or could have been supported, the network bandwidth configuration setting may be modified to reflect a high bit rate.

FIG. 1 is a block diagram of an exemplary communications system 100 configured to enable a client 110 to use a network 120 to access a content source 130. Generally, the client 110 is configured to determine whether the client is operating in a device environment for which a configuration has been determined. When the client 110 is operating in such a device environment, a network bandwidth configuration setting is used to specify a bandwidth to be used in accessing content from the content source 130. Subsequently, access to the content source is monitored and a client metric (e.g., a score) is generated to reflect or enable comparison against the network bandwidth specified by the network bandwidth configuration setting. The client metric then is used to modify a tracking indicator that signals whether the network bandwidth configuration setting should be adjusted so that the client 110 accesses the content source 130 using a different bandwidth or range of bandwidths, or it may be used to inspire a change to the network bandwidth configuration setting directly.

The client 110 typically includes a computing device enabling a user to exchange information over a communications network. The client 110 may include one or more devices capable of accessing content residing on the content source 130. The client 110 may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a micro-browser application on a reduced operating system with general purpose and specialized hardware capable of operating in mobile environments.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 typically includes hardware and/or software capable of enabling direct or indirect communications between the client 110 and the content source 130. As such, the network 120 may include a direct link between the client 110 and the content source 130, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The content source 130 generally includes one or more devices configured to distribute digital content. Typically, a content source 130 includes a collection or library of content for distribution. Alternatively, or in addition, the content source 130 may convert a media source (e.g., a video or audio feed) into a feed of data units for transmission across the network 120. The content source 130 may include a general-purpose computer having a central processor unit (CPU), and memory/storage devices that store data and various programs such as an operating system and one or more application programs. Other examples of a content source 130 includes a workstation, a server, a special purpose device or component, a broadcast system, other equipment, or some combination thereof capable of responding to and executing instructions in a defined manner. The content source 130 also may include an input/output (I/O) device (e.g., video and audio input and conversion capability), and peripheral equipment such as a communications card or device (e.g., a modem or a network adapter) for exchanging data with the network 120.

The content source 130 is generally capable of executing instructions under the command of a controller. The content source 130 may be used to provide content to the client 110. The controller may be implemented by a software application loaded on the content source 130 for commanding and directing communications exchanged with the client 110. Other examples of the controller include a program, a piece of code, an instruction, a device, a computer, a computer system, or a combination thereof, for independently or collectively instructing the client 110 or the content source 130 to interact and operate as described. The content source 130 may be embodied permanently or temporarily in any type of machine, component, physical or virtual equipment, storage medium, or propagated signal capable of providing instructions to the client 110 or the content source 130.

The content source may include a duplicating switch. Generally, a duplicating switch includes a device that performs network operations and functions in hardware (e.g., in a chip or part of chip). In some implementations, the duplicating switch may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP (Internet Protocol) address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which clients are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The host 140 may include a system configured to assist the client 110 in managing access to the network. In one example, the host 140 is used to perform one or more operations or calculations that instruct the client 110 how to access the network 120 on the content source 130. For example, the host 140 may be configured to determine whether the client 110 is accessing the network 120 in a manner for which the network bandwidth configuration setting should be used (e.g., by analyzing the IP address used by the client 110). In another example, the host 140 is used as a reference (e.g., to gauge a state of the network 120) or to store configuration information (e.g., a network bandwidth configuration setting or alternate bandwidth indicator).

Figure 2:
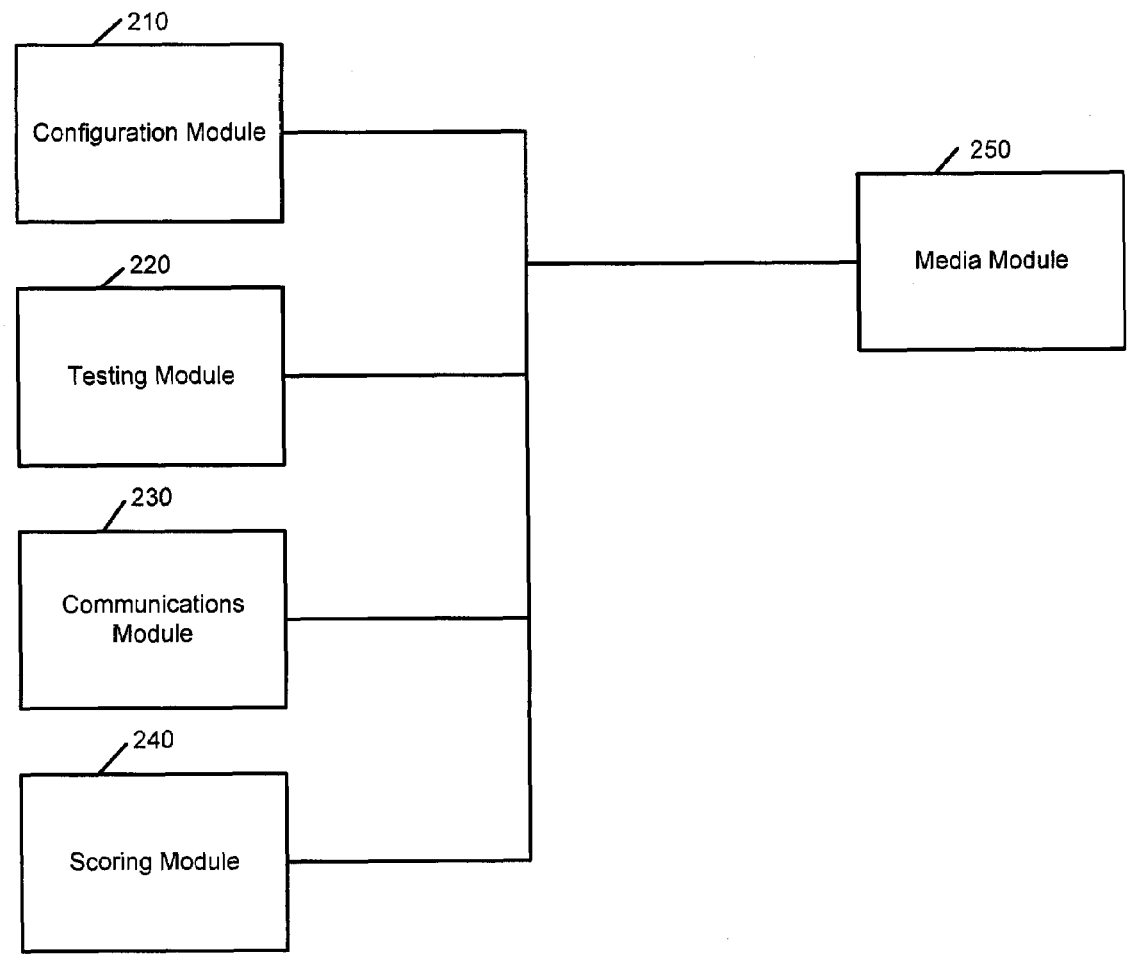
FIG. 2 is a block diagram of an exemplary system configured to manage access to a content source.

FIG. 2 is a block diagram of an exemplary system 200 configured to manage access to a content source. For convenience, particular components and messaging formats described earlier are referenced. However, similar methodologies may be applied in other implementations where different components are used to define the structure of the system, or where the functionality is distributed differently among the components shown. The components described with respect to system 200 may be included in a client (e.g., client 110), a host (e.g., host 140), a network component such as switch, a duplicating switch, or a router, or a combination of one or more of the previously described or other devices.

The system 200 includes a configuration module 210, a testing module 220, a communications module 230, a scoring module 240, and a media module 250.

The configuration module 210 includes a system, program, or code segment configured to provide a network bandwidth configuration setting describing how a client may access a network. Generally, the network bandwidth configuration setting includes configuration information specifying a predetermined bit rate to be used by a client when operating in a device environment for which the network bandwidth configuration setting is determined.

In one implementation, the configuration module 210 is configured to associate a device environment such as a Media Access Control (MAC) address, an IP address, or a range of IP addresses with a network bandwidth configuration setting. Thus, the network bandwidth configuration setting also may include or be associated with the device environment for which one or more network bandwidths are believed to be valid. In a slight variation, the configuration module 210 is configured to associate the network bandwidth information with IP address information for one or more intervening networks between the client and the content source for which the network bandwidth configuration setting is believed to be valid.

Alternatively, or in addition, the configuration module 210 may be configured to associate user information with the network bandwidth configuration setting. The configuration module may be configured to provide a network bandwidth configuration setting to a client when a particular screen name or user identity logs into an online service provider. The configuration module 210 may be configured to use both device and user information. For example, when a particular screen name is using a particular system (as identified by a MAC address or CPU identifier), a particular network bandwidth configuration setting may be used or provided.

In one implementation, the configuration module 210 is configured to manage multiple network bandwidths in the network bandwidth configuration setting. For instance, the testing module 220 may indicate that five network bandwidths may be used (e.g., 50 kbps, 100 kbps, 300 kbps, 600 kbps, 1.5 mbps) with the highest quality bandwidth (e.g., the 1.5 mpbs feed) being the preferred bandwidth that is initially used when the client access the content source. In another instance, a range of network bandwidths is managed where the network bandwidth configuration setting may use bandwidths that fall within the specified range. The range may be coupled to a preferred bandwidth, indicating an approximate bandwidth that should initially be used if possible. The approximate bandwidth may be correlated to a closest offered bandwidth depending on the bandwidths being offered on the content source. For example, when the preferred bandwidth specifies 400 kbps, and the closest bandwidths are 300 kbps and 500 kbps, the 300 kbps bandwidth may be selected when the client determines that the 300 kbps is the closest supported bandwidth (perhaps because it is determined that the 500 kbps service would experience difficulties).

The testing module 220 includes a device configured to determine performance for an application across a network. For example, the testing module 220 may include a code segment configured to monitor performance as a media module 250 accesses streaming audio or video across the network. The testing module 250 may be used in this manner to determine which bandwidths can be supported from a device environment. Moreover, the testing module 250 may be configured to identify a particular bandwidth, or a range of bandwidths, or to identify a preferred bandwidth that is initially used when the client is operating in the device environment for which the network bandwidth configuration setting is believed to be valid.

The communications module 230 is used to exchange communications with other devices in the communications system (e.g., communications system 100 in FIG. 1). Depending on which underlying device(s) include the system 200 (e.g., a client, a content source, or a host used to manage access), the communications module 230 may be used to exchange a network bandwidth configuration setting, identify a device environment, enable access to an online resource (e.g., send or receive a video stream), test the network performance, or configure other devices in a communications system.

The scoring module 240 includes a code segment configured to quantify the actual performance realized by the content requested when attempting to communicate at the network bandwidth specified by the network bandwidth configuration setting, so that the quantified performance may be used in a scoring system that determines how a client uses a network to access a content source. The scoring module 240 may include a quantification code segment configured to receive one or more metrics relating to application performance across a network (e.g., latency, jitter, throughput, and/or utilization) and to generate a client metric for the parameter(s). In one implementation, the client metric indicates the degree of application support. One such client metric may use a first indicator (e.g., a '1') to indicate support for high bit rate video, a second indicator to indicate support for low bit rate video (e.g., a '2'), a third indicator to indicate support for high bit rate audio (e.g., a '3'), a fourth indicator to indicate support for low bit rate audio (e.g., a '4'), and a fifth indicator to indicate support for text (e.g., a '5').

Another client metric may quantify the relative degree of performance (e.g., between 0 and 100). Thus, support for high bit rate video may lie between 90 and 100, support for low bit rate video may fall within the range of 80-90, support for high bit rate audio may fall between 70-80, support for low bit rate audio between 60-70, and support for text, images, or HTML support would be described by values as less than 60.

Yet another scoring system may use binary values. For example, a client may be associated with a particular configuration (e.g., using 300 kbps of bandwidth when accessing video content). A binary scoring system may indicate whether the particular configuration was supported for the duration of the connection.

The scoring module 240 may use a tracking indicator configured to describe the network performance (using the client metric) over time or multiple sessions. In one implementation, the system 200 maintains a log or history that describes performance during a specified preceding number of connections. In another implementation, a temporal code segment maintains a success or failure rate with respect to a particular configuration.

The scoring module 240 may include a decision code segment configured to determine whether to use a particular network bandwidth configuration setting in accessing a network. For example, the scoring module 240 may initially use a testing module 220 to determine a network bandwidth configuration setting (e.g., identify a bit rate and/or a content source to be used in accessing streaming media). The scoring module 240 may monitor subsequent access to the content source and update the tracking indicator as a result. If the client experiences underruns at a specified frequency (e.g., more than 30% of the time) or in a specified pattern (e.g., falling back twice in a row), the scoring module 240 may make a determination that the prior configuration can no longer be used. The scoring module 240 may instruct the testing module 220 to determine a new configuration, or the testing module may analyze prior performance to identify a bit rate.

The media module 250 may include a media application or code segment configured to render output to a user. In one implementation, the media module 250 includes a media player configured to access and display/render streaming audio, video, metadata, and/or text.

Figure 3:
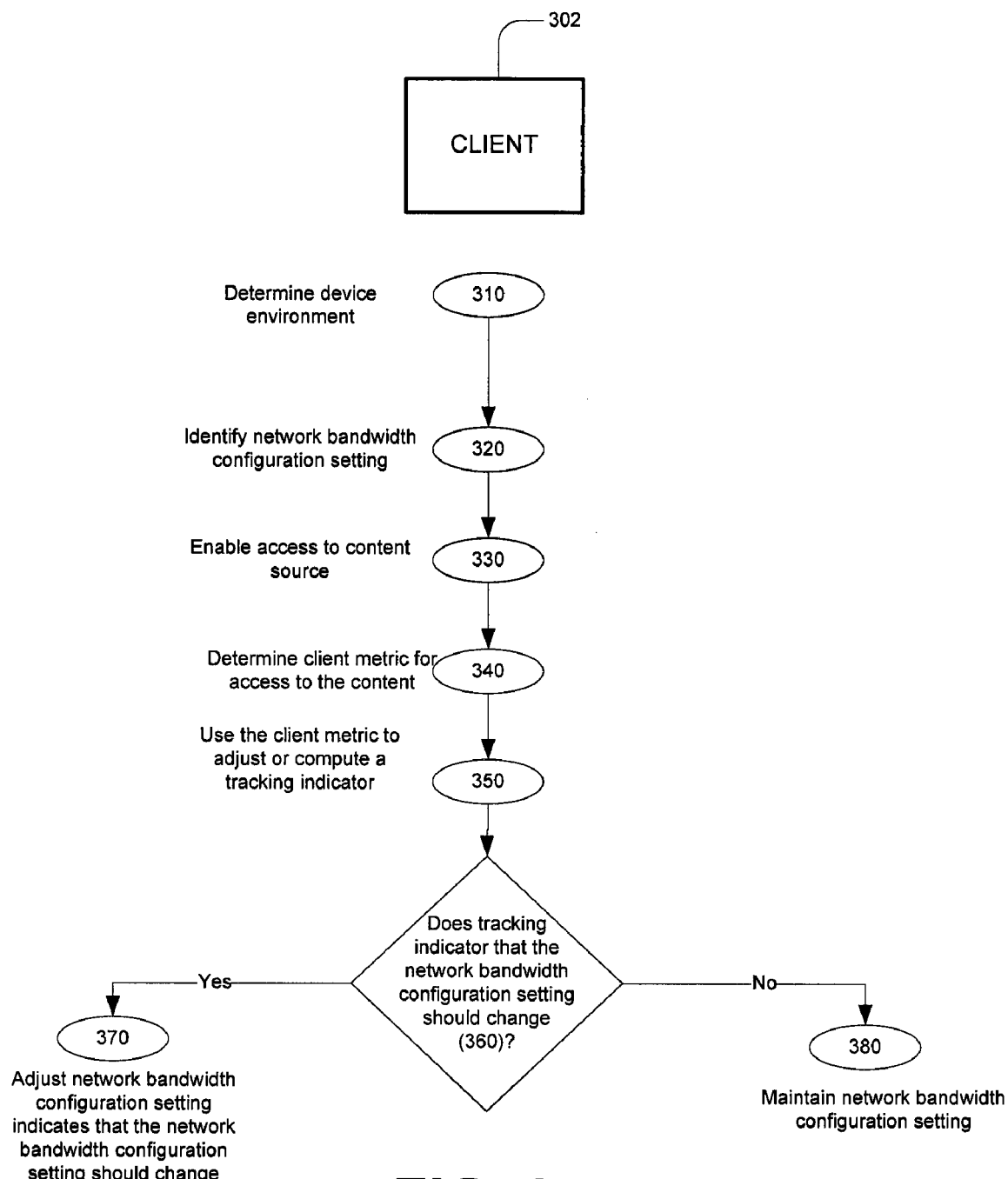
FIG. 3 is a flow chart of an exemplary process by which a client manages access to a content source.

FIG. 3 is a flow chart of an exemplary process 300 by which a client 302 manages access to a content source 304. For convenience, particular components and messaging formats described earlier are referenced as performing the process. However, similar methodologies may be applied in other implementations where different components are used to define the structure of the system, or where the functionality is distributed differently among the components shown.

The client 302 determines a device environment (310). Generally, determining a device environment includes determining a device descriptor and/or configuration used to access a content source. For example, determining a device descriptor may include identifying the PC used by an online identity (e.g., screen name) to access the Internet. Similarly, determining a device environment may include determining which network connection (e.g., a dialup modem, an Ethernet interface, a DSL (Digital Subscriber Loop) connection, or a wireless interface) is being used to access the Internet. In addition or as an alternative, determining a device environment may include determining whether a client is using specified network information (e.g., IP address or Media Access Control (MAC) address) associated with a network bandwidth configuration setting. For example, determining a device environment may include determining that the client is using an IP address in an IP address range associated with a particular performance.

The client 302 identifies the network bandwidth configuration setting (320). For example, the client 302 may identify a configuration associated with a particular configuration or location.

In one example, identifying the network bandwidth configuration setting may include conducting tests that include downloading as much content as possible as quickly as possible over a predetermined period of time and subsequently determining how much content was downloaded during the period. In another example, determining the network bandwidth configuration setting includes attempting to download content at ever increasing bandwidth levels.

The client 302 accesses the content source 304 using the network bandwidth configuration setting when the client 302 is in the device environment (330). When the client 302 is determined to be in the device environment for which a network bandwidth configuration setting (e.g., bit rate) has been previously identified (e.g., to access a video stream on a content source), the network bandwidth configuration setting may be used to access the video. To illustrate, a user may use a cable modem to access Internet-based video streaming servers. A particular set of video streaming servers and a bit rate may be used when the user uses the cable modem to access the video streaming servers. When the user uses another device (e.g., uses a laptop with a dialup modem) to access the video services, a new configuration may be determined, or other configurations may be used.

The client 302 determines a client metric (340). Generally, a client metric is determined to quantify the access between the client 302 and the content source 304. The client 302 then uses the client metric to adjust or compute a tracking indicator (350) and determines whether to adjust the network bandwidth configuration setting for a client (360). For example, the client 302 may adjust the tracking indicator to provide an assessment of the network bandwidth configuration setting being used that makes allowances for inaccuracies, variances, or challenges for a few sessions within the context of a larger number of sessions.

The client 302 may adjust the network bandwidth configuration setting when the tracking indicator indicates that the network bandwidth configuration setting should change (370). For example, the tracking indicator may indicate that the preferred bandwidth, which may include the highest bandwidth, has failed repeatedly or a high number of times during the most recent sessions. Adjusting the network bandwidth configuration setting may include determining that the highest bandwidth should be no longer be the preferred bandwidth, or that the highest bandwidth should be removed from the bandwidths appearing in the network bandwidth configuration setting. In contrast, when the tracking indicator indicates that the client 302 has transitioned or could have transitioned to a higher bit rate stream, the network bandwidth configuration setting may be modified to reflect that the network bandwidth configuration setting could have been used. When the tracking indicator indicates that the network bandwidth configuration setting should not change, the network bandwidth configuration setting is maintained (380).

To illustrate process 300 being used by a client, an example will be provided whereby the client uses the previously operations. An online service provider subscriber uses a PC (e.g., a client) to listen to an Internet Radio station that is transmitted as an IP stream. Media player software on the PC initially determines the device environment by determining that the PC is using an Ethernet card to access the IP stream across a cable network. The media player then retrieves a network bandwidth configuration setting that allows the PC to access the Internet stream at 128 kbps, and also allows the PC to download the IP stream at 64 kbps and 32 kbps when the PC is experiencing difficulty with the 128 kbps stream. The media player is configured to use the network bandwidth configuration setting so long as the tracking indicator does not indicate consecutive failures, or experience two failures in three sessions. In the event of consecutive failures or two-failures-in-three, the media player is configured to remove the preferred bandwidth experiencing the failure from the bandwidths appearing in the network bandwidth configuration setting. The media player requests and accesses the Internet Radio Station as an IP stream encoded at 128 kbps. After accessing the content, the media player evaluates the performance in accessing the IP stream, and determines a client metric for the streaming session. A first session is interrupt-free, which results in a client metric of success (1) in a Boolean scoring system. The media player compares the client metric of one with the tracking indicator, and determines that no changes need to be made to the network bandwidth configuration setting since the present network bandwidth configuration setting appears to be working well.

The media player then accesses the Internet Radio station three times in the next day (using the cable network). In the first of the three times, the media player experiences repeated underruns and drops down to 64 kbps. The underrun and subsequent transition are scored as a failure (zero). The media player compares the failure client metric of zero with the tracking indicator, and determines that no changes need to be made at this time to the network bandwidth configuration since one failure in light of the tracking indicator's history represents an infrequent occurrence. During the second of the three sessions, the media player does not experience any difficulties and scores the second session as a success or one. The media player compares the client metric of one with the tracking indicator, and determines that no changes need to be made to the network bandwidth configuration setting. The tracking indicator may be adjusted, and in particular, a counter that tracks consecutive failures may be reset since the most recent session was a success. However, the media player experiences underruns during the third session. The third session is scored as a failure. When the media player compares the client metric with the tracking indicator, the two-failures in three sessions criteria have been met, and the media player adjusts the network bandwidth configuration setting so that the 128 kbps setting is removed.

Figure 4:
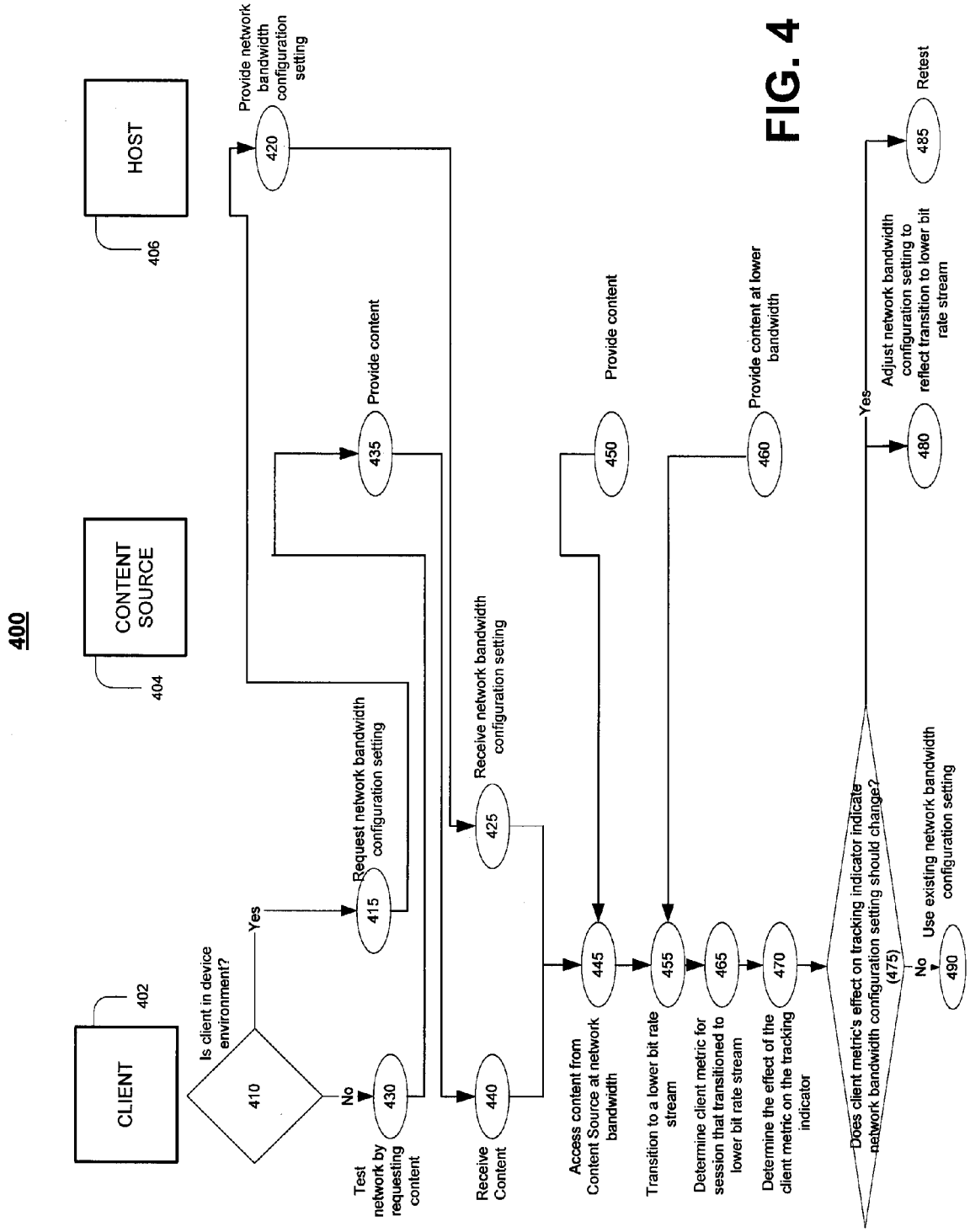
FIG. 4 is a flow chart of an exemplary process by which a client selectively invokes managed access to a content source.

FIG. 4 is a flow chart of another exemplary process 400 by which a client selectively invokes managed access to a content source. For convenience, particular components and messaging formats described earlier are referenced as performing the process. However, similar methodologies may be applied in other implementations where different components are used to define the structure of the system, or where the functionality is distributed differently among the components shown.

The client 402 determines if the client is operating in the device environment (410). Typically, determining if the client 402 is in the device environment includes determining if the client 402 is in an environment for which a previously determined network bandwidth configuration setting may be used.

If the client 402 is in the device environment, the client 402 retrieves a network bandwidth configuration setting (415), which the host 406 then provides (420). For example, the host 406 may provide an identity of a content source 404 (e.g., an IP address) and/or a network bandwidth to be used to access a content source. The client 402 receives the network bandwidth configuration setting (425).

If client 402 is not in the device environment, the client 402 tests the network by requesting content (430). When it is established that an identified bandwidth level may be maintained, the bandwidth level may be increased to determine if a higher bandwidth level may be maintained. Testing the next bandwidth level may include testing the different bandwidths associated with the different service offerings (e.g., 100 kbps, 300 kbps, and 600 kbps video) as an alternative to testing at uniform increments (e.g., increasing the tested bandwidth in uniform increments). The content source 404 then provides content (435), which the client 402 receives (440).

Whether the client 402 determines the network bandwidth through testing (e.g., by operation 430) or by using a network bandwidth configuration setting (e.g., by operation 425), the client 402 accesses a content source 404 (445), which provides content. At a subsequent time, the client 402 may experience a network fault, underruns, or other problematic condition causing the client 402 to transition to a lower bit rate stream (455). The fault may relate to or cause an underrun that affects the client's ability to keep up with access to the content source 404. For instance, the intervening network may only support 200 kbps of bandwidth when the client 402 is accessing a 300 kbps stream. The content source 404 provides a lower bit rate stream (460). The client 402 determines a client metric for the session that transitioned to a lower bit rate reflecting the transition (465). The client 402 determines the effect of the client metric on the tracking indicator (470). For example, the client 402 may determine whether the effect of the session that transitioned indicates that future use of the present configuration in the network bandwidth configuration setting would likely lead to future difficulties, problems, fault conditions, or less than optimal performance. If the analyzing the client metric and/or tracking indicator indicates that 1) the fault was an infrequent occurrence; 2) the fault is not severe enough to warrant reconfiguration; and/or 3) there is an explanation for the fault that will not occur in the future, the client 402 may continue to use the existing network bandwidth information (490). If, on the other hand, the tracking indicator indicates that the fault is severe or frequent enough to warrant reconfiguration, the client 402 adjusts the network bandwidth configuration setting. Adjusting the network bandwidth configuration setting may include retesting (480). Retesting may be used to generate a new network bandwidth configuration setting, or to confirm one or more settings (e.g., bandwidths) within the network bandwidth configuration setting. Alternatively, the existing network bandwidth configuration setting may be modified in accordance with the results of the scoring and tracking indicator. For example, when the tracking indicator indicates that a particular bandwidth can no longer be consistently supported, the network bandwidth configuration setting may be modified so that the particular bandwidth is removed from the network bandwidth configuration setting, or is no longer designated as a preferred bandwidth. When the tracking indicator indicates that a higher bit rate was or could be supported, the network bandwidth configuration setting may be modified so that the high bit rate is added to the network bandwidth configuration setting, and/or used as a preferred bandwidth.

Other implementations are within the scope of the following claims. For example, multiple or alternative bandwidth indicators may be used when the client is not in the device environment (e.g., an alternate environment for when a different device is being used for a user identity).

The network bandwidth configuration setting may be downloaded from a host. For example, a user may use a number of devices to access an Internet radio station. A network bandwidth configuration setting may be generated and associated with one or more of the access techniques. For example, where a household includes multiple PCs, so long as a user is using one of the PCs in the household, the underlying access networks may provide the similar performance so that client need not test for each of the devices within the household. Alternatively, when a user is traveling on business and using different access networks, different network bandwidth configuration settings may be generated for a user for each access network or class of access networks. For example, if a client travels to a remote office and uses different PCs in the remote office, retrieving the network bandwidth configuration settings from a host may reduce or eliminate the need for testing to be performed from the different devices that are used in the remote office.

The client metric, the tracking indicator, and/or the network bandwidth configuration setting may be adjusted upon the completion of an operation or session, or while the session is occurring. For example, a streaming connection that lasts for an extended period of time may by divided into smaller time units and a client metric may be generated for the smaller time units. The client metrics for the smaller time units then may be analyzed while the stream is still being accessed.

What is claimed is:

1. A method of configuring a client to access a network, the method comprising:
   receiving a first request from a client to access first content;
   receiving a second request from the client to access second content;
   identifying a first networked content source for the first request;
   identifying a second networked content source for the second request, the second networked content source residing on a different resource and a different location that the first networked content source;
   identifying a first network bandwidth configuration setting to be used by the client in accessing the first networked content source;
   identifying a second network bandwidth configuration setting to be used by the client in accessing the second networked content source;
   enabling the client to access the first networked content source using the first network bandwidth configuration setting;
   monitoring client access to the first networked content source;
   monitoring client access to the second networked content source;
   comparing first client access metrics to metrics associated with the first network bandwidth configuration setting in a first comparison;
   comparing second client access metrics to metrics associated with the second network bandwidth configuration setting in a second comparison;
   determining, based on the first comparison, whether to adjust the first network bandwidth configuration settings for the client;
   determining, based on the second comparison, whether to adjust the second network bandwidth configuration settings for the client;
   adjusting the first network bandwidth configuration setting while preserving the second network bandwidth configuration settings if the first comparison indicates that the first network bandwidth configuration settings should be adjusted and the second comparison indicates that the second network bandwidth configuration settings should be preserved.

2. The method of claim 1 wherein identifying a first network bandwidth configuration setting includes identifying a range of network bandwidths with one or more bandwidths that may be used to access the first networked content source.

3. The method of claim 2 wherein identifying the range includes identifying a preferred bit rate used to access the first networked content source.

4. The method of claim 1 wherein comparing the first client access metrics includes determining whether the bandwidth used in accessing the first networked content source was less than a bandwidth associated with the first network bandwidth configuration setting.

5. The method of claim 1 wherein comparing the first client access metrics includes determining whether the bandwidth used in accessing the first networked content source was greater than a bandwidth associated with the network bandwidth configuration setting.

6. The method of claim 1 wherein comparing the first client access metrics includes determining whether a bandwidth used in accessing the first networked content source could have been increased.

7. The method of claim 1 wherein comparing the first client access metrics includes determining whether the client experienced network interruptions in accessing the content source, and adjusting the network bandwidth configuration setting after determining the network interruptions would persist using the network bandwidth configuration setting.

8. The method of claim 1 wherein adjusting the first network bandwidth configuration setting includes using a tracking indicator to determine whether a particular event described by the client metric has occurred at a specified frequency.

9. The method of claim 1 wherein adjusting the first network bandwidth configuration setting includes using a tracking indicator to determine whether a particular event described by the client metric has occurred a specified number of times.

10. The method of claim 9 wherein using the tracking indicator to determine whether the particular event described by the client metric has occurred the specified number of times includes determining whether the specified number of times has occurred repeatedly.

11. The method of claim 10 wherein using the tracking indicator to determine whether the particular event described by the client metric has occurred the specified number of times includes determining whether the client increased the bandwidth used, decreased the bandwidth used, could have used an increased bandwidth, or experienced a network interruption.

12. The method of claim 9 wherein adjusting the network bandwidth includes using a supportable bandwidth as indicated by the first client metrics or a tracking indicator.

13. The method of claim 1 further comprising storing the first network bandwidth configuration setting on a host.

14. The method of claim 1 further comprising storing the first network bandwidth configuration setting on a client.

15. A system with a processor configured to manage access to a network, the system comprising:
a processor; and
instructions that when executed on the processor cause the processor to:
receive a first request from a client to access first content;
receive a second request from the client to access second content;
identify a first networked content source for the first request;
identify a second networked content source for the second request, the second networked content source residing on a different resource and a different location that the first networked content source;
identify a first network bandwidth configuration setting to be used by the client in accessing the first networked content source;
identify a second network bandwidth configuration setting to be used by the client in accessing the second networked content source;
enable the client to access the first networked content source using the first network bandwidth configuration setting;
monitoring client access to the first networked content source;
monitor client access to the second networked content source;
compare first client access metrics to metrics associated with the first network bandwidth configuration setting in a first comparison;
compare second client access metrics to metrics associated with the second network bandwidth configuration setting in a second comparison;
determine, based on the first comparison, whether to adjust the first network bandwidth configuration settings for the client;
determine, based on the second comparison, whether to adjust the second network bandwidth configuration settings for the client; and
adjust the first network bandwidth configuration setting while preserving the second network bandwidth configuration settings if the first comparison indicates that the first network bandwidth configuration settings should be adjusted and the second comparison indicates that the second network bandwidth configuration settings should be preserved.

16. A computer program on a computer readable medium, the computer program comprising:
a storage medium; and
instructions that when executed on the processor cause the processor to:
receive a first request from a client to access first content;
receive a second request from the client to access second content;
identify a first networked content source for the first request;
identify a second networked content source for the second request, the second networked content source residing on a different resource and a different location that the first networked content source;
identify a first network bandwidth configuration setting to be used by the client in accessing the first networked content source;
identify a second network bandwidth configuration setting to be used by the client in accessing the second networked content source;
enable the client to access the first networked content source using the first network bandwidth configuration setting;
monitoring client access to the first networked content source;
monitor client access to the second networked content source;
compare first client access metrics to metrics associated with the first network bandwidth configuration setting in a first comparison;
compare second client access metrics to metrics associated with the second network bandwidth configuration setting in a second comparison;
determine, based on the first comparison, whether to adjust the first network bandwidth configuration settings for the client;
determine, based on the second comparison, whether to adjust the second network bandwidth configuration settings for the client; and
adjust the first network bandwidth configuration setting while preserving the second network bandwidth configuration settings if the first comparison indicates that the first network bandwidth configuration settings should be adjusted and the second comparison indicates that the second network bandwidth configuration settings should be preserved.

* * * * *